Sept. 29, 1931.  H. B. REDDING  1,825,544
GATE VALVE STRUCTURE
Filed Dec. 23, 1927  2 Sheets-Sheet 2
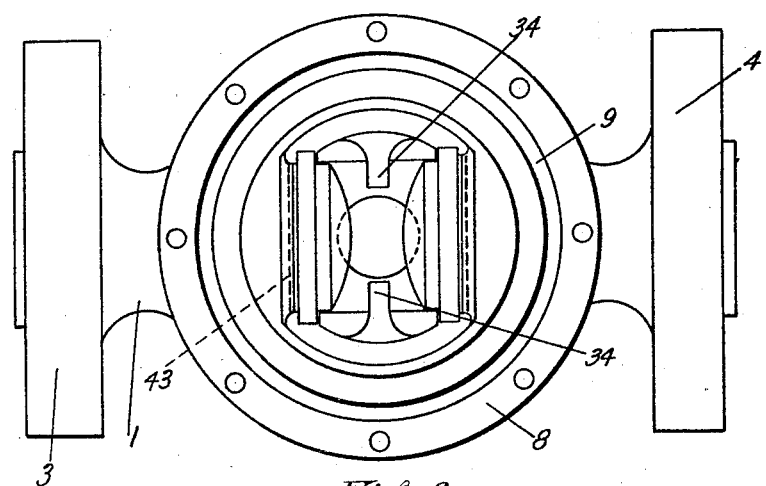
Fig. 3
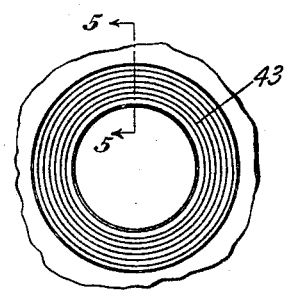
Fig. 4
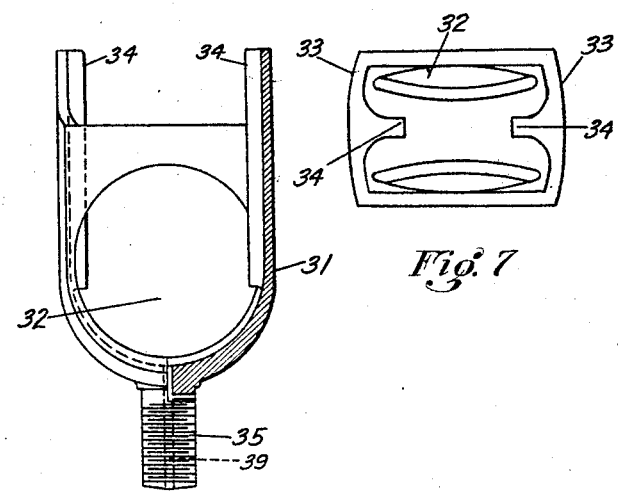
Fig. 6
Fig. 7
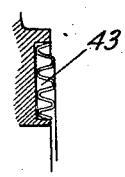
Fig. 5
INVENTOR.
Harry B. Redding.
BY
ATTORNEY.

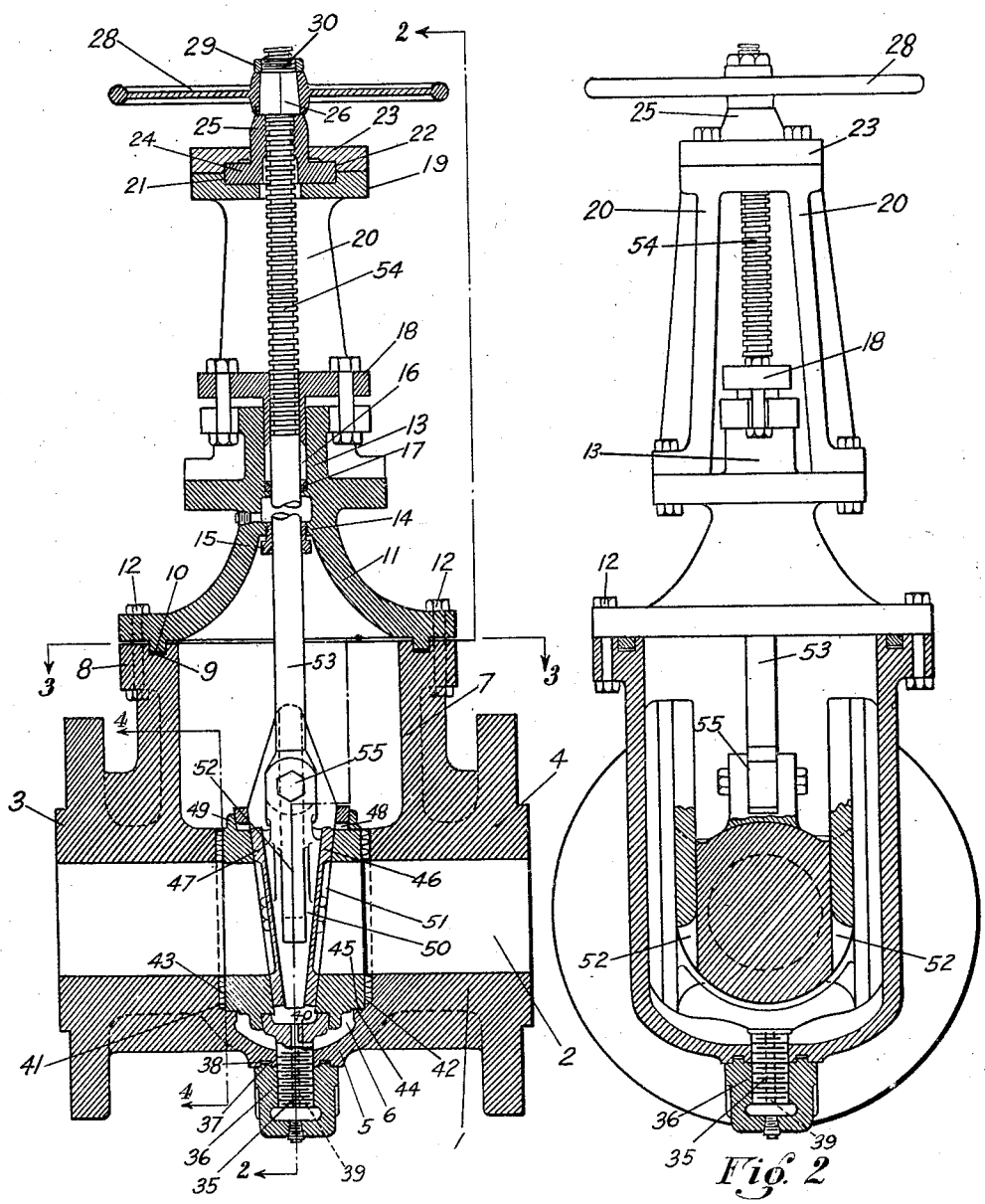

Patented Sept. 29, 1931

1,825,544

UNITED STATES PATENT OFFICE

HARRY B. REDDING, OF CLEVELAND, OHIO, ASSIGNOR TO THE VALVE EQUIPMENT COMPANY, OF COLUMBUS, OHIO, A CORPORATION OF OHIO

GATE VALVE STRUCTURE

Application filed December 23, 1927. Serial No. 242,065.

My invention relates to gate valve structure. It has to do particularly with gate valves that are designed to be used in high pressure and high temperature systems, although it is not absolutely limited thereto.

One of the objects of my invention consists in the provision of a gate valve which will be free from leakage which usually occurs as the result of expansive or contractive and wearing actions in systems of this type. I have found that the use of threaded ring parts which are directly subject to the high pressure fluid of the system are particularly liable to leakage.

My invention comprises the provision of a gate valve construction in which the joints, which are directly subject to the fluid passing through the system, are not of the threaded type. Nevertheless, my structure is such that both removable valve faces and seats are provided to compensate for wear and facilitate adjusting.

More particularly, my valve structure preferably comprises a plurality of valve seats which may be forced laterally against the cooperative surfaces of the valve casing by means of a wedging action to which they are subjected by a valve cage during its movement into proper position. Thus, I preferably provide a valve cage which is adjustable within the valve casing in a path substantially at right angles to the line of flow of the fluid through the casing and this valve cage, by such adjustment, automatically forces the valve seats laterally of its own movement.

The preferred embodiment of my invention is shown in the accompanying drawings wherein similar characters of reference designate corresponding parts and wherein:

Figure 1 is a vertical longitudinal section of my gate valve structure.

Figure 2 is a transverse section taken on line 2—2 of Figure 1.

Figure 3 is a section taken on line 3—3 of Figure 1, looking in the direction of the arrows.

Figure 4 is a section taken on line 4—4 of Figure 1, looking in the direction of the arrows.

Figure 5 is a detailed section taken on line 5—5 of Figure 4.

Figure 6 is a side elevation of my valve cage, partly in section.

Figure 7 is a plan view of the valve cage shown in Figure 6.

In the drawings, my valve casing is shown at 1 as having a straight bore 2 therethrough. This valve casing is provided with spaced surfaces 3 and 4 and substantially in the center thereof are concentric openings or conduits through the casing. These surfaces 3 and 4 are designed to receive the valve seats in a manner to be subsequently described.

The casing 1 is provided centrally in its lower side with an aperture 5 and immediately above this aperture is a tapered well 6. The aperture 5 is designed to receive a threaded bolt on the bottom of the valve cage, this threaded bolt passing through the aperture with ample clearance and adapted to receive an adjusting nut in a manner to be described.

On the upper side of the casing 1, it is provided with an upstanding skirt 7 having a circular flange 8 formed on its upper end. This flange 8 is grooved as at 9 on its upper surface for the reception of a tongue 10 carried by a bonnet member 11. The bonnet member 11 is secured to the flange by means of bolts 12.

This bonnet member 11 is bored as at 13 and threaded as at 14 for the reception of a threaded collar 15 designed to center the valve stem. This bonnet structure is further provided with a packing well 16 having a washer 17 mounted in its base and having a packing follower 18 mounted in its upper end.

The extreme upper end of the bonnet structure carries an annular flange 19 supported upon standards 20 of a yoke. This flange member is provided with a groove in its upper surface as at 21 which cooperates with a groove 22 in a cap member 23 to support the lower end 24 of a stem nut 25. This stem nut is internally threaded to cooperate with the threads of the valve stem and has a portion of its external surface of angular form as at 26 for the reception of the hub 27 of a wheel 28. The interior of the hub is likewise of angular form so that relative rotation is precluded and this wheel is held in position by means of a nut 29 threaded upon the threads 30 which are carried upon the stem nut 25 immediately above its angular portion.

The valve cage is shown best in Figures 6 and 7 and it comprises a body portion 31 which is of box-like form as shown in plan in Figure 7. It has an aperture 32 in either side thereof and, midway between the sides thereof, its end walls 33 carry integral rib members 34. Integrally formed upon the lower end of this valve cage is a threaded bolt 35.

As illustrated in Figures 1 and 2, this threaded bolt carried upon the lower end of the valve cage is designed to pass through the aperture 5 in the lower end of the casing 1 with substantial clearance. It is adapted to receive, on the outside of the cage, a compensating nut 36 whose upper surface is provided with a tongue 37 for fitting into a groove 38 to ensure that no leakage will occur even under extreme pressures and when the gate of the valve is wide open.

The valve seats are shown at 41 and 42 and, as shown, they are separated from the supporting surfaces 3 and 4 of the casing by means of corrugated steel gaskets 43. At the lower sides, these valve seats rest upon shoulders 44 and these shoulders 44 serve to limit their downward movement. These valve seats are themselves provided with shoulders 45 which are complemental to the shoulders 44. The inner surfaces of the valve seats are provided with outstanding seat portions 46 and 47.

The valve cage 31 is of wedge-like form as shown best in Figure 1. Its openings 32 embrace and contain the seat portions 46 and 47 of the valve seat members. At the same time, there is ample clearance between the inner walls of the openings 32 and the outer walls of the seat portions 46 and 47, as illustrated at 48 in Figure 1. Likewise, the outer surfaces of the valve cage act as a wedge complemental to the surfaces 48' of the flanges 49 of the valve seat members.

In operation, with the parts in position as shown in Figure 1, the adjustment of the compensating nut 36 to draw the valve cage downwardly will serve to force these outer sides of the valve cage with a wedging action against the surfaces 48 of the portions 49 of the valve seat member. Since the downward movement of these seat members is prevented by the shoulders 44 of the casing, the valve seat members can only move laterally, that is, away from each other. This wedging action, therefore, firmly forces these valve seat members in a lateral direction against the corrugated steel washers, if they are being used, or against the surfaces 3 and 4, if the steel washers are not being used.

The valve used by me preferably comprises a body portion 50 having removable and adjustable valve facings 51. This body portion is provided with a groove on either edge thereof as at 52 for the reception of the integral ribs 34 of the valve cage. The valve stem is shown at 53 and it will appear that threads 54 are provided thereon. The valve stem is connected to the body portion of the valve by means of a pivot connection, as at 55, so that the valve may readily center itself without straining.

The bolt 35 on the lower end of the valve cage is provided with a central duct 39 leading from the interior of the valve cage to the lower end of the bolt. A lateral drainage duct 40 connects the central duct 39 with the well 6. The compensating nut 36 is provided with a chamber immediately below the lower end of the duct 39 for connection of the moisture and a drainage plug is provided in the nut to permit the valve to be readily drained when not in use.

It is worthy of note that the valve seats, in exterior form, are higher than they are wide. In other words, the exterior sides of these valve seats are flattened. This results in a reduction of the necessary area of the bonnet, inasmuch as the central well of the casing may be made smaller and, in consequence, the total pressure to which this bonnet will be subjected is reduced.

It will be seen that I have provided a construction of valve which obviates the use of threads in dangerous places. Furthermore, the valve structure is of simple construction and has a number of other advantageous features.

It will be seen that I have provided a gate valve construction in which the valve seat rings are automatically and positively forced against the casing of the valve by the adjustment of the valve cage downwardly. Furthermore, it should be noted that the seat rings are carried by the valve casing and do not move angularly of the conduit through the casing. In addition to being forced against the casing by the adjustment of the valve cage downwardly, the seating of the valve itself serves to further force these seats against the casing.

There are other and various features of importance, such as the drainage ports through the threaded portion of the valve cage and the tongue and groove connection between the nut which draws the cage downwardly and the casing. Likewise, the particular structure of the seat rings and the valve cage are important features. Other features of importance will appear from the description and the appended claims.

Having thus described my invention, what I claim is:

1. A gate valve structure comprising a casing, spaced valve seats, inclined flanges on said valve seats, an adjustable valve cage movable longitudinally relative to said inclined flanges to force said valve seats laterally when adjusted, a projection on said cage extending through a wall of the casing, and means cooperating with said projection and the casing for drawing said cage toward said wall.

2. A gate valve structure comprising a casing with fluid ports therethrough, shoulders carried by said casing, spaced valve seat rings carried by said shoulders in substantial alignment with the fluid ports in said casing, a wedge member adjustable to force said rings laterally into fluid-tight relation to said casing, a projection rigidly united with the wedge member and extending through a wall of the casing, and means cooperating with said projection and the casing for drawing the wedge member toward said wall.

3. A gate valve structure comprising a casing with fluid ports therethrough, spaced valve seat rings substantially aligning with fluid ports in said casing, integral seat flanges on said rings, a wedge-like cage member mounted in between said rings and provided with openings into which said integral seat flanges project, said cage member being adjustable longitudinally relatively to said seat rings to force said rings laterally into fluid-tight relation to said casing, a threaded shank rigidly united with the cage and extending through a wall of the casing, and a nut engaging the threaded shank and bearing against said wall for drawing the cage toward said wall.

4. A gate valve structure comprising a casing with fluid ports therethrough, shoulders on said casing, spaced valve seat rings supported on said shoulders substantially in alignment with fluid ports in said casing, integral seat flanges on said rings, a wedge-like cage member mounted in between said rings and provided with openings into which said integral seat flanges project, said cage member being adjustable to force said rings laterally into fluid-tight relation to said casing, a projection on the cage extending through a wall of the casing, and means cooperating with said projection and wall for drawing the cage toward said wall.

5. A gate valve structure comprising a casing, a valve cage, a well in said casing beneath said valve cage, and drainage ducts leading from the interior of said cage and from said well.

6. A gate valve structure comprising a casing, and a valve cage, said valve cage having a drainage duct leading from the interior thereof.

7. A gate valve structure comprising a casing, a valve cage having a portion thereof extending through the base of said casing, and a drainage duct leading from the interior of said casing through said portion.

8. A gate valve structure comprising a casing, a valve cage having a threaded portion extending through the base of said casing, a drainage duct extending through the threaded portion of said valve cage and a nut threaded onto such threaded portion and having a drainage chamber therein.

In testimony whereof I, hereby, affix my signature.

HARRY B. REDDING.